H. A. H. RICE.
TROLLING SPOON.
APPLICATION FILED OCT. 3, 1917.

1,252,721. Patented Jan. 8, 1918.

INVENTOR
Harry A. H. Rice
BY
Fred G. Dieterich & Co
ATTORNEYS

UNITED STATES PATENT OFFICE.

HARRY A. H. RICE, OF DUNCAN, BRITISH COLUMBIA, CANADA.

TROLLING-SPOON.

1,252,721.

Specification of Letters Patent.

Patented Jan. 8, 1918.

Application filed October 3, 1917. Serial No. 194,572.

*To all whom it may concern:*

Be it known that I, HARRY A. H. RICE, a citizen of the Dominion of Canada, residing at Duncan, in the Province of British Columbia, Canada, have invented certain new and useful Improvements in Trolling-Spoons, of which the following is a specification.

This invention relates to an artificial fish bait of that class commonly designated a fishing spoon, and the improvements have been directed to a particular form of spoon that will receive and flash all available light while the bait is drawn through the water under a manner of connection to the line which permits the spoon to rotate on an axis represented by the line of the flight to which the hook is connected.

Figure 1:
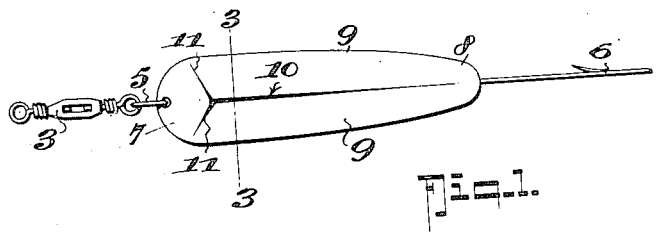

The invention is particularly described in the following specification, reference being made to the drawings by which it is accompanied, in which:

Figure 1 is a profile of the bait.

Figure 2:
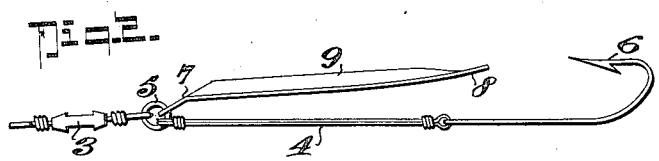

Fig. 2, a side elevation of the same.

Figure 3:

Fig. 3, a cross section on the line 3—3 in Fig. 1, and

Figure 4:
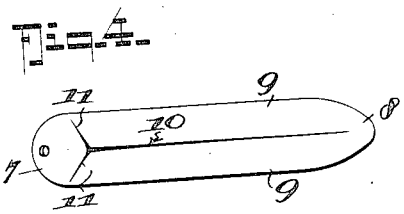

Fig. 4 shows a modified and preferred profile of spoon.

In these drawings 3 represents the swivel by which the trolling line is connected to the spoon and its hook flight 4 by the ring 5, and 6 represents the hook.

The spoon comprises a body of thin sheet metal which in profile, see Fig. 1, is rounded at the end 7 to which the trolling line swivel and the hook flight are connected, and is reduced slightly in width and ovately rounded at the free or tail end 8.

From adjacent the front or head end 7 to adjacent the tail end 8 the sides 9 of the body are flatly and uniformly bent from the middle line 10 to an obtuse angle, as shown in Fig. 3, and the sector of the arc of the front end 7 is flatly bent to a similar angle across the middle line, see Fig. 1, the intersection of the planes of the sides 9 and end 7 being along the lines 11.

Toward the tail end 8 the edges of the sides 9 turn slightly toward the plane of the ridge along the middle line 10, as shown in Fig. 2, that is, the tail end 8 is reversely turned to the front end 7.

The hook flight 4 is independently connected to the same ring 5 which connects the trolling line swivel 3 to the head end 7 of the spoon, and this flight 4 terminates just short of the end of the tail 8 of the spoon, so that the connection to it of the shank of the hook 6 is within the length of the spoon and the hook itself extends about half the length of the spoon beyond its end 8.

The spoon and the hook flight are free to spin on the trolling line swivel connection 3, which spin is obviously due to an unavoidable unbalanced area of the spoon. During this spin the weight of the spoon and centrifugal action will tend to draw its axis away from the line of forward movement to rotate at an angle thereto; but the movement of the spoon through the water will counteract this tendency to some extent and will draw it toward the line of forward movement.

The angle which the rotating spoon maintains in relation to the line of forward movement will change with the changing velocity with which the spoon is trolled, whether such changing velocity is due to the pull of the boat oars or to the movement imparted by the fisherman to his rod, if such is used.

In use, the spoon spins very close to the axis of rotation and the reflection of the light from the rotating six polished facets 7 and 9 of the spoon, counting both faces of each plane surface, will reflect sidewise and forward and backward from the planes as the spoon rotates. This rapidly varying reflection and the changing angle of the spoon certainly appears to have an attraction for the fish for the bait has proven a most effective and killing one.

It must be remembered also that the slight bend of the tail will cause a variation in the flight of the bait as the velocity of trolling changes.

I do not desire to be confined to an outline wherein the sides are tapered from the head end toward the tail end, as described, and as illustrated in Fig. 1, as in the preferred form the sides are substantially parallel between the rounded ends, as shown in Fig. 4. The round of the tail end is somewhat ovate.

Having now particularly described my invention, I hereby declare that what I claim as new and desire to be protected in by Letters Patent is:

1. An artificial fish bait comprising a narrow elongated body of thin sheet metal having a head end and a tail end respectively bent in opposite directions at obtuse angles with the body, the body portion being bent along the middle line to form sides at an obtuse angle from one another throughout the greater part of their length, said sides being flat surfaces and polished to reflect light, and means for connecting one end of said body to the trolling line and for connecting the hook to the body.

2. An artificial fish bait, comprising a narrow elongated body of thin sheet metal rounded at each end, the head end being bent to an obtuse angle across the width of the body and the body portion being bent along the middle line to form sides at a similar angle from one another, the angled front and sides being flat and polished on both sides of the thickness to reflect light, and means for connecting the angled head end to a ring on the trolling line swivel to which ring the hook flight is also connected.

3. An artificial fish bait, comprising a narrow elongated body of thin sheet metal rounded at each end and tapered slightly from the head end toward the tail, the head end being bent to an obtuse angle across the width of the body and the body portion being bent along the middle line to form sides at a similar obtuse angle from one another throughout the greater part of their length, the angle of the sides being gradually flattened adjacent the tail end and that end turned to the opposite side of the head end angle, the angle front and sides being flat and polished on both sides of the thickness to reflect light, and means for connecting the angled head end to the ring on the trolling line swivel to which the hook flight is connected.

4. An artificial fish bait, comprising a narrow elongated body of thin sheet metal rounded at each end and having its sides parallel between the rounded ends, the head end being bent to an obtuse angle across the width of the body and the body portion being bent along the middle line to form sides at a similar obtuse angle from one another throughout the greater part of their length, the angle of the sides being gradually flattened adjacent the tail end and that end turned to the opposite side of the head end angle, the angled front and sides being flat and polished on both sides of the thickness to reflect light, and means for connecting the angled head end to the ring on the trolling line swivel to which the hook flight is connected.

5. In an artificial bait, a narrow elongated thin sheet metal body having a head end and a tail end, said body intermediate the head and tail ends being bent along the middle line to form sides at an obtuse angle from one another throughout the greater part of their length, said sides being flat surfaces and polished to reflect light, the tail end of said body being bent out of the general plane of the body proper.

In testimony whereof I affix my signature.

HARRY A. H. RICE.